United States Patent
Sang et al.

(10) Patent No.: US 12,248,103 B2
(45) Date of Patent: Mar. 11, 2025

(54) SYSTEM AND METHOD FOR LiDAR DEFOGGING

(71) Applicant: National Yang Ming Chiao Tung University, Hsinchu (TW)

(72) Inventors: Tzu-Hsien Sang, Hsinchu (TW); Sung-You Tsai, New Taipei (TW); Tsung-Po Yu, Taichung (TW)

(73) Assignee: NATIONAL YANG MING CHIAO TUNG UNIVERSITY, Hsinchu (TW)

(*) Notice: Subject to any disclaimer, the term of this patent is extended or adjusted under 35 U.S.C. 154(b) by 1021 days.

(21) Appl. No.: 17/213,681

(22) Filed: Mar. 26, 2021

(65) Prior Publication Data

US 2021/0302554 A1     Sep. 30, 2021

(30) Foreign Application Priority Data

Mar. 27, 2020 (TW) .................................. 109110394

(51) Int. Cl.

| G01S 7/497 | (2006.01) |
|---|---|
| G01S 7/48 | (2006.01) |
| G01S 7/4861 | (2020.01) |
| G06N 20/00 | (2019.01) |

(52) U.S. Cl.
CPC ............ *G01S 7/497* (2013.01); *G01S 7/4808* (2013.01); *G01S 7/4861* (2013.01); *G06N 20/00* (2019.01); *G01S 2007/4977* (2013.01)

(58) Field of Classification Search
CPC ...... G01S 7/497; G01S 7/4808; G01S 7/4861; G01S 2007/4977; G01S 17/10; G01S 17/89; G01S 17/931; G01S 7/487; G06N 20/00; G06N 3/08
See application file for complete search history.

(56) References Cited

U.S. PATENT DOCUMENTS

| 2019/0361100 A1* | 11/2019 | Abari ................... G01S 17/42 |
|---|---|---|
| 2021/0025990 A1 | 1/2021 | Ozawa et al. |

FOREIGN PATENT DOCUMENTS

| TW | 1673190 B | 10/2019 |
|---|---|---|
| TW | 201939009 A | 10/2019 |
| TW | 202001288 A | 1/2020 |
| WO | WO 2019/167485 A1 | 9/2019 |

OTHER PUBLICATIONS

Shamsudin (doc. "Fog removal using laser beam penetration, laser intensity, and geometrical features for 3D measurements in fog-filled room" (Year: 2016).*
Li et al. (doc"What happens for a ToF LiDAR in fog?" (Year: 2020).*

(Continued)

*Primary Examiner* — Assres H Woldemaryam
(74) *Attorney, Agent, or Firm* — Birch, Stewart, Kolasch & Birch, LLP (57) ABSTRACT

A system and method for LiDAR defogging is disclosed. The method comprises: applying a detection device to determine the fog status and generate a histogram; determining the fog concentration between a target location and the detection device in the histogram according to the histogram; and applying a defogging method to defog the fog concentration between the target location and the detecting device.

6 Claims, 5 Drawing Sheets

(56) References Cited

OTHER PUBLICATIONS

Bansal et al. (doc. "A Review of Image Restoration based Image Defogging Algorithms"). (Year: 2017).*

Asvadi et al., "DepthCN: Vehicle detection using 3D-LIDAR and ConvNet", IEEE 20th International Conference on Intelligent Transportation Systems (ITSC), 2017, total 6 pages.

Satat et al., "Towards photography through realistic fog", 2018 IEEE International Conference on Computational Photography, total 10 pages.

Shamsudin et al., "Fog removal using laser beam penetration, laser intensity, and geometrical features for 3D measurements in fog-filled room", Advanced Robotics, Apr. 2016, pp. 729-743.

Song et al., "The irradiating field of view of imaging laser radar under fog conditions in a controlled laboratory environment", Journal of Optics, 2017, vol. 19, No. 4, pp. 1-8.

Zorzi et al., "Full-waveform airborne LiDAR data classification using convolutional neural networks", IEEE Transactions on Geoscience and Remote Sensing, 2019, total 7 pages.

\* cited by examiner

SYSTEM AND METHOD FOR LIDAR DEFOGGING

TECHNICAL FIELD

The present invention generally relates to a method and system for LiDAR defogging. In particularly, the present invention relates to a defogging method and system comprising the application of LiDAR technology for defogging.

RELATED ART

In recent years, advanced driver assistance system (ADAS) has become a research hot topic, and there are many pieces of research on automatic driving, collision avoidance, and object and lane recognition. In order to ensure their high reliability in vehicle applications, data fusion from different sensors is usually used. Among the sensors, optical detection and ranging (LIDAR), radar detection and ranging (radar) sensor and camera are the main sensors, and each has its own advantages and disadvantages.

Cameras have a high object recognition ability and are low cost and widely used in many fields. However, a camera can only record the environment in 2D images, which makes it difficult to estimate distance to a target. In addition, a camera is limited by the light source, and its operation is greatly restricted in a dark or low visibility environment. Radar can estimate the distance, angle, and speed of objects. Compared with light, radio waves have less attenuation in adverse weather conditions (such as fog). However, the disadvantages of radar, such as low spatial resolution, make it difficult to identify objects. On the other hand, LiDAR usually estimates the distance from an object by the time of flight (ToF) of a laser pulse. Therefore, due to the high directivity of the laser, LiDAR has a high spatial resolution. Nevertheless, LiDAR is more susceptible to severe weather conditions. In particular, solving the issue of smoke interference is a hot topic recently.

SUMMARY

In one embodiment, the LiDAR defogging system of the present invention includes: a detection device that emits a detection signal, and a target location that receives a detection signal; wherein the detection device emits the detection signal passing through the fog to reach the target location to determine the fog condition, so as to generate a histogram, and use the histogram to determine the fog concentration between the target location and the detection device in the histogram, and apply the defogging method to remove the fog concentration between the target location and the detection device.

In one embodiment, the detection device collects the blank channel information where no target location exists, determines the fog condition according to the reflectivity of the emitted detection signal, and further generates a histogram.

In one embodiment, the detection signal is a laser pulsed light wave, hence the detection device uses the time-related single photon technology to record the time information of each photon reception event of the emitted laser pulsed light wave; within an integration time unit, the time information of multiple photon reception events caused by multiple laser pulse light waves is accumulated to form a histogram.

In one embodiment, the detection device processes the histogram and estimates the distance and reflectivity between the target location and the detection device and determines the fog concentration between the target location and the detection device in the histogram.

In an embodiment, the defogging method is either the best scenario comparison method or the deep learning method, wherein the best scenario comparison method is comparing a histogram with another best scenario histogram to remove the fog.

In one embodiment, if the fog concentration is heavy and the distance between the target location and the detection device is short, then one should use the defogging method to remove the fog.

In one embodiment, the method of LiDAR defogging of the present invention includes: using a detection device to determine the fog condition so as to generate a histogram; determining the fog concentration between the target location and the detection device according to the histogram, and further applying the defogging method to remove the fog concentration between the target location and the detection device.

In one embodiment, the step of using the detection device to determine the fog condition and generate the histogram further includes: collecting blank channel information with no target present to determine the fog condition; applying the photon reflectance emitted by the detection device to generate the histogram.

In one embodiment, the time-related single photon technology can be used to record the time information of each photon reception event, and the time information of multiple photon reception events caused by multiple laser pulse light waves within an integration time unit can be accumulated to form the histogram.

In one embodiment, the histogram is processed to further estimate the distance from and reflectivity of the target location, and to determine from the histogram the fog concentration between the target location and the detection device.

In an embodiment, if the concentration of the fog is heavy and the distance between the target location and the detection device is short, then use the defogging method to remove the fog.

In one embodiment, the defogging method is either one of the best scenario comparison method and the deep learning method, wherein the best scenario comparison method is to compare the histogram with another best scenario histogram to remove the fog.

DETAILED DESCRIPTION

Figure 1:
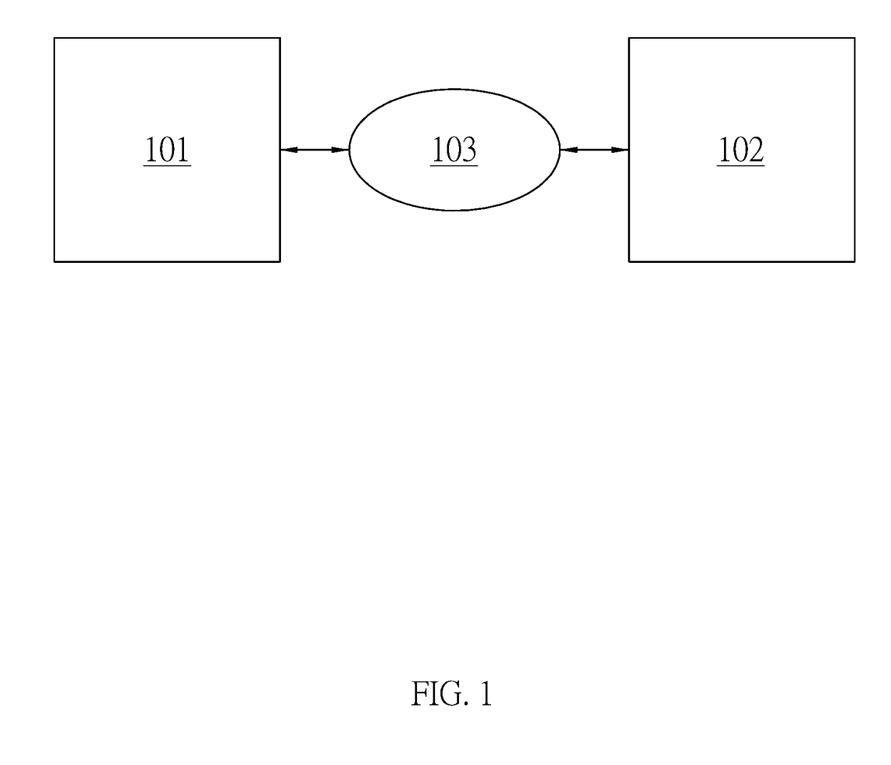
FIG. 1 shows a block diagram of the LiDAR defogging system according to the present invention.

FIG. 1 is a block diagram showing a LiDAR defogging system according to an embodiment of the present invention. This system includes a detection device 101 and a target location 102. The detection device 101 emits a detection signal passing through the fog 103 to the target location 102 to determine the fog condition and generate a histogram, and, based on the histogram, determines the fog concentration between the target location 102 and the detection device 103 in the histogram and applies a defogging mode to remove the concentration of fog between the target location 102 and the detection device 101.

The detection device 101 mentioned above can collect the information of the blank channel where no target location 102 exists and determine the fog condition according to the reflectivity of the emitted detection signal, thereby generating a histogram. The aforementioned detection signal can be a laser pulsed light wave, so the detection device 101 can apply time-related single photon technology to record the time information of each photon reception event of the emitted laser pulsed light wave; within an integration time unit, a histogram can be formed by accumulating time information of multiple photon reception events caused by multiple laser pulse light waves. The detection device 101 can also process the histogram to further estimate the distance and reflectivity between the detection device 101 and the target location 102 and determine the fog concentration between the target location 102 and the detection device 101 from the histogram. The defogging method mentioned above is the best scenario comparison method. The best scenario comparison method is to compare the histogram with another best scenario histogram to remove the fog. The defogging method mentioned above also can be the deep learning method. If the fog concentration is too low and the distance between the target location and the detection device is short, the target detection distance estimation method is applied to remove the effect of the fog.

Figure 2:
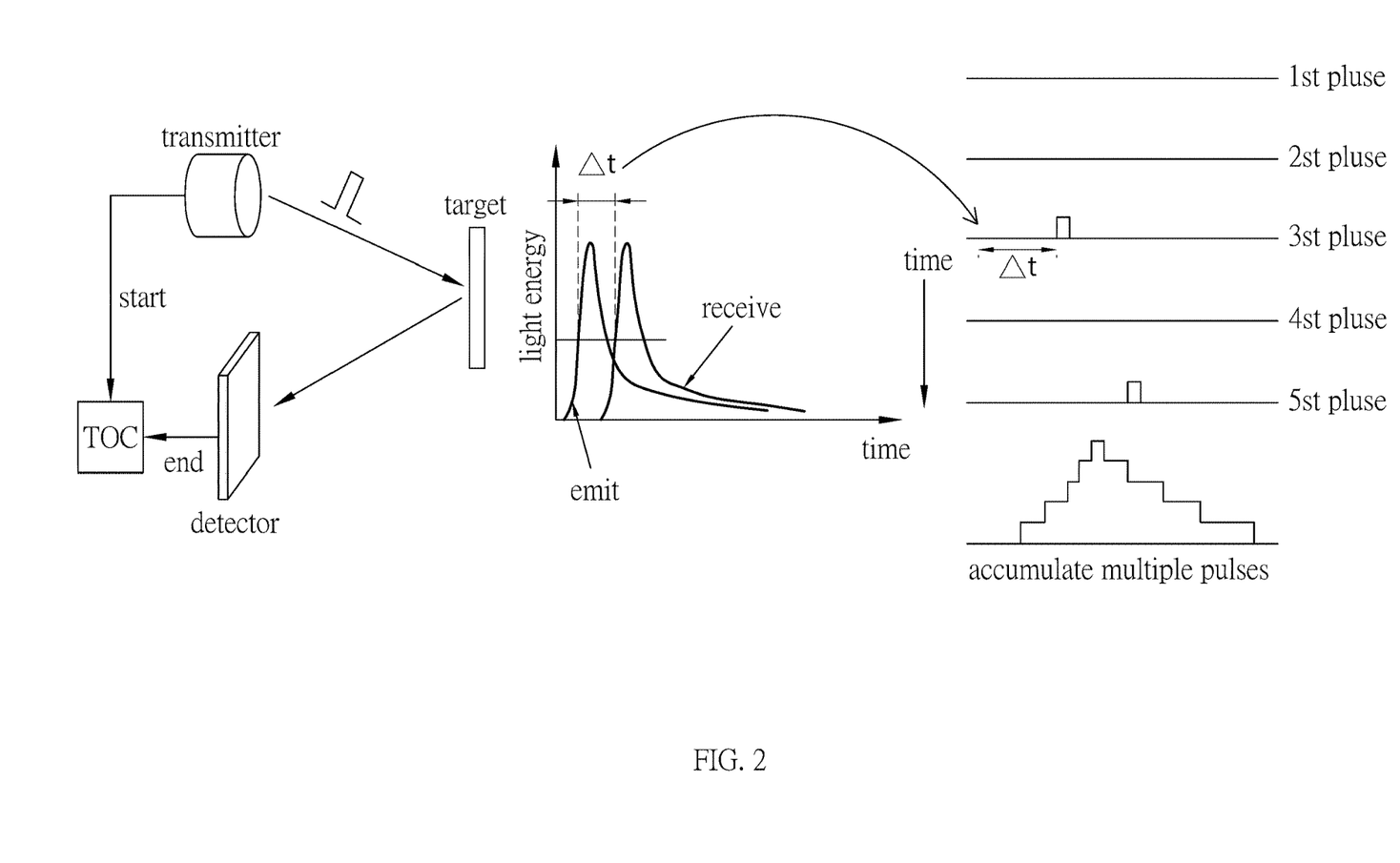
FIG. 2 shows a block diagram of applying SPAD to form a histogram according to the present invention.

In this embodiment, a LiDAR of single photon avalanche diode detector (SPAD for short) is used. Since the SPAD can detect a single photon event, it is more sensitive than the general LiDAR. FIG. 2 shows a block diagram of histogram formation using SPAD. As shown in FIG. 2, in the process of scanning the target, the LiDAR repeatedly emits laser pulse light wave signals for the same pixel position within an integration time unit. The reflected light wave of the target returns to the detector after a certain ToF and generates a photon reception event, and the time correlated single photon counting (TCSPC) unit can record the time information of each photon reception event with an instrument (TOC), The time information of multiple photon receiving events caused by multiple laser pulse waves in an integration time unit can be accumulated to form a histogram of photon receiving events at the pixel position. By processing the histogram, one can estimate the distance and reflectance of the target location. For example, the peak value or center of gravity of the histogram can correspond to ToF, and the peak value can correspond to the reflectance. The distance and reflectance information of each pixel are combined according to the corresponding orientation, which is obtained by scanning the surrounding environment of 3D point cloud. The SPAD of FIG. 2 first senses the target with a transmitter and a detector to form a graph of emitted and received light energy, and then forms a histogram composed of multiple pulses.

In this embodiment, the LiDAR defogging system used in the present invention can use the LiDAR technology to first determine whether the fog condition exists and its severity. The present invention proposes to collect the information of the blank channel where no target exists, so as to determine the fog condition and make a rough estimate of the fog concentration. Since LiDAR can generate a histogram of photon reception events by using a single-photon detector, this histogram is then used for advanced signal processing. In the process of LiDAR scanning, it can almost be confirmed that there exists a blank channel with no target. Collecting the histograms of these channels can be used to estimate the fog condition. The fog concentration will be roughly divided into no fog or light fog, whose corresponding visibility is about one kilometer or more, severe fog, whose visibility ranges from one kilometer to 100 meters (low visibility), and extremely heavy fog, whose visibility is 100 meters or below (very low visibility).

Figure 3:
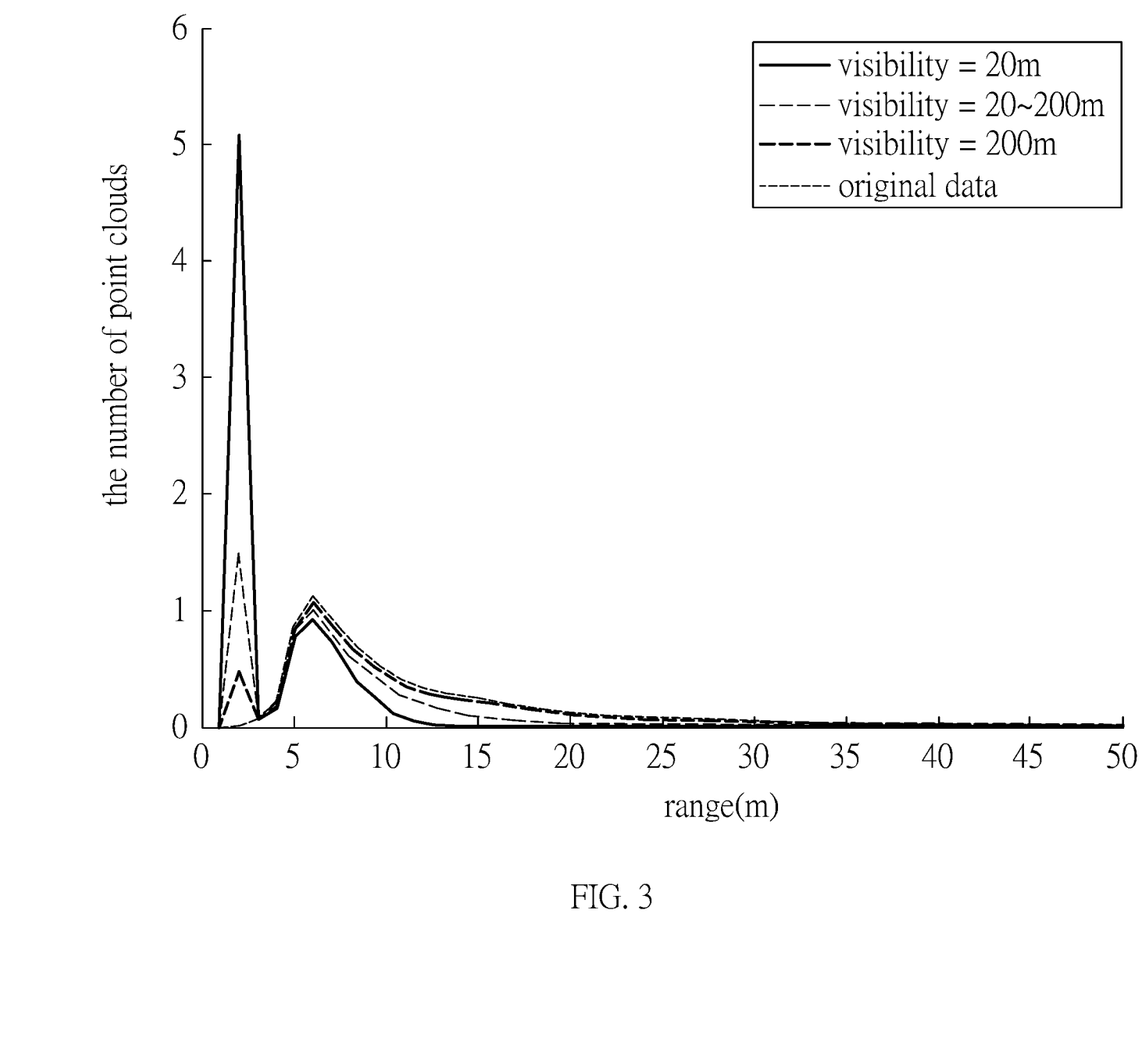
FIG. 3 shows the statistical results of a public LiDAR point cloud database and (simulated) point cloud after fogging according to the present invention.

In this embodiment, FIG. 3 shows the statistical results of a public LiDAR point cloud database and (simulated) fogged point cloud. The number of the false point cloud generated by fog in a short distance (within 5 meters) and the normal point cloud by general targets form two peak areas, and the ratio of the two peaks values carries information about the different visibilities of the fog. Such data type differences can be used to estimate the fog condition. If the histogram of the photon reception event corresponding to each pixel of the point cloud is used, a more reliable estimation result can be obtained. The number of point clouds are all different in the visibilities of 20 meters (m), 2 to 200 meters, and over 200 meters.

Figure 4:
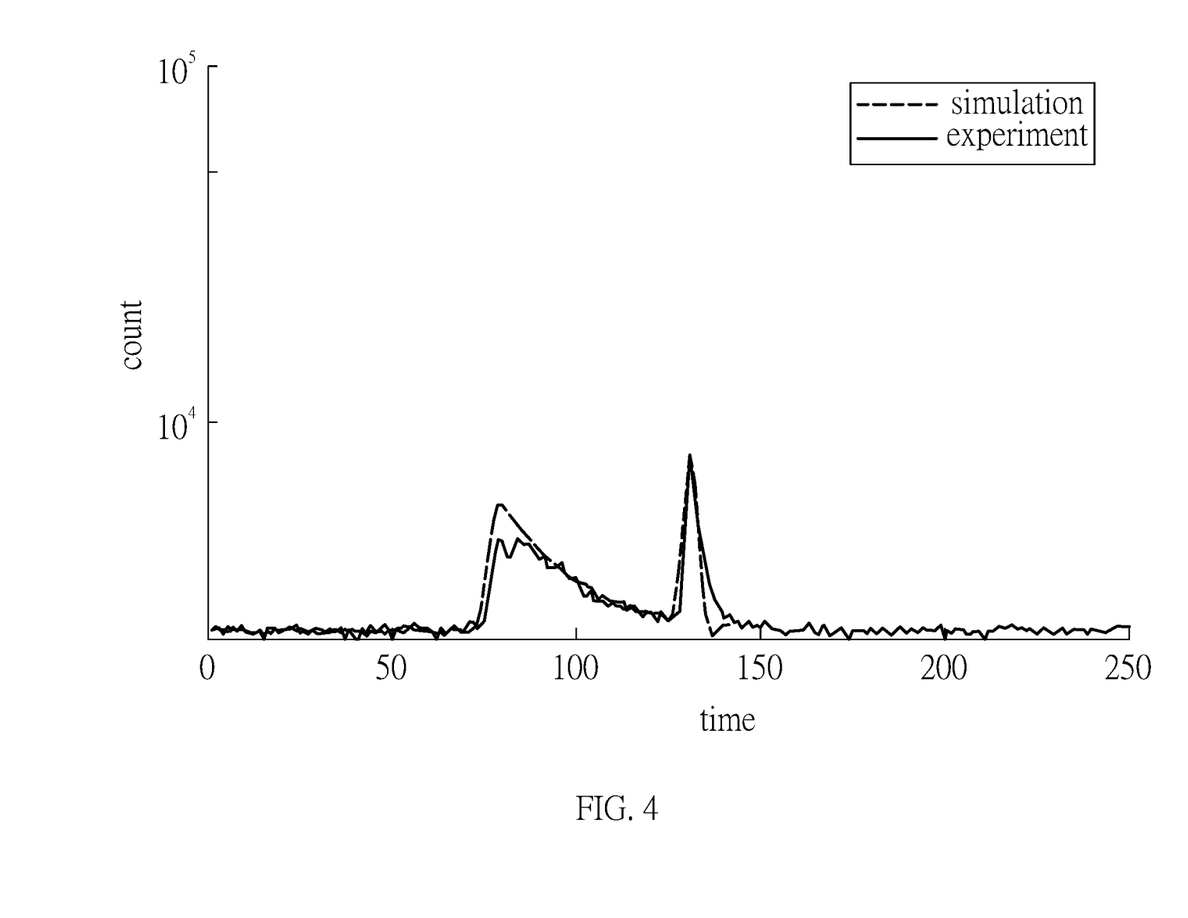
FIG. 4 shows the histogram generated by LiDAR technology and the histogram obtained from the experiment under fogging according to the present invention.

FIG. 4 shows the histogram generated by the LiDAR technology and the histogram obtained experimentally in the case of fogging. FIG. 4 shows the histogram (dotted line) simulated by LiDAR's physical model, and the data (solid line) obtained from the fog tube experiment. The histogram shows two wave peaks, the fog signal is flatter on the left and the target signal is sharper on the right. The fog status can be estimated by using the location and peak value of the fog signal. The simulation and experimental values are in good agreement, which also verifies that we can use simulation to study the defogging.

Secondly, LiDAR should take different countermeasures to deal with different concentrations of fog and operation range of different distances, or use more than one different LiDAR for scanning. A very rough estimate of LiDAR applicable range is half of the visibility number. For example, when the visibility is 200 meters, the effective operating range of LiDAR is 100 meters. The use of advanced signal processing technology can increase its effective operation range, but it will not increase much. Within this effective range, the influence of fog on the LiDAR will also vary depending on the distance of the target, so the LiDAR must take different strategies depending on the situation, or even use different LiDAR's to deal with different distance ranges.

The influence of fog on LiDAR efficiency can be basically divided into two major effects. The first is to weaken the energy of the target echo, and the second is that the echo caused by the fog greatly interferes with the estimation of the normal target. The combination of these two effects and the different fog density conditions can result in at least six conditions that require different countermeasures. Under light fog conditions, the echo energy of mid-long range targets is not weakened too much and can be detected by general target detection and distance estimation. However, due to the interference of fog echoes, for close-range targets, sensitivity of target detection and range estimation methods need to be improved. Under severe fog conditions, the echo energy of the mid-long range targets will be weakened to a very low level, while the close-range targets will encounter great fog echo interference. Hence the target detection and the distance estimation for the target in the mid-long range (about 20 meters or more) and close-range (within about 20 meters) must adopt different strategies and even operate different LiDAR. In extremely heavy fog conditions, it is impossible to detect mid-long range targets effectively and stably. As such, LiDAR should focus on short-range targets.

In summary, the detection of mid-long range targets can be carried out by general target detection and distance estimation under the condition of no fog or light fog. Under heavy fog, the target echo energy needs to be increased. Under extremely heavy fog, it is recommended to give up the detection of mid-long range targets. The specific operation methods for increasing the target echo energy are as follows: increasing the laser energy, increasing the laser emission frequency, reducing the resolution requirements of the mid-range and long-range point cloud, and improving the efficiency of the SPAD detector, etc. Some measures can be implemented by signal processing, and some measures require the changing of the operating parameters of LiDAR. For short-range targets, the robustness of the target detection and distance estimation methods needs to be improved in light fog condition, and the severe and extremely heavy fog conditions require the intervention of defogging techniques.

For the aforesaid situation of heavy fog and close-range target, the present invention proposes two defogging technologies, which mainly use the difference between the distribution patterns caused by fog and targets in the photon receiving event histogram to separate out the distribution patterns of the targets. One is to use Expectation Maximization (EM) to estimate the photon reception histogram of fog in the blank channel as a template, and set it into other channels to eliminate the effect of fog in the best (expected maximum) way. The histogram obtained in the aforementioned best way is a histogram that can be measured with a blank channel, and some key parameter values of the conventional LiDAR technology or algorithm are applied, and then these parameters are generated through the LiDAR technology or algorithm to generate an ideal or best scenario histogram. The best scenario histogram is then compared with the histogram of the photon reception event to eliminate the fog. The second is to use deep learning to eliminate the effects of fog. The deep learning method can use artificial intelligence or neural networks to remove fog.

Figure 5:
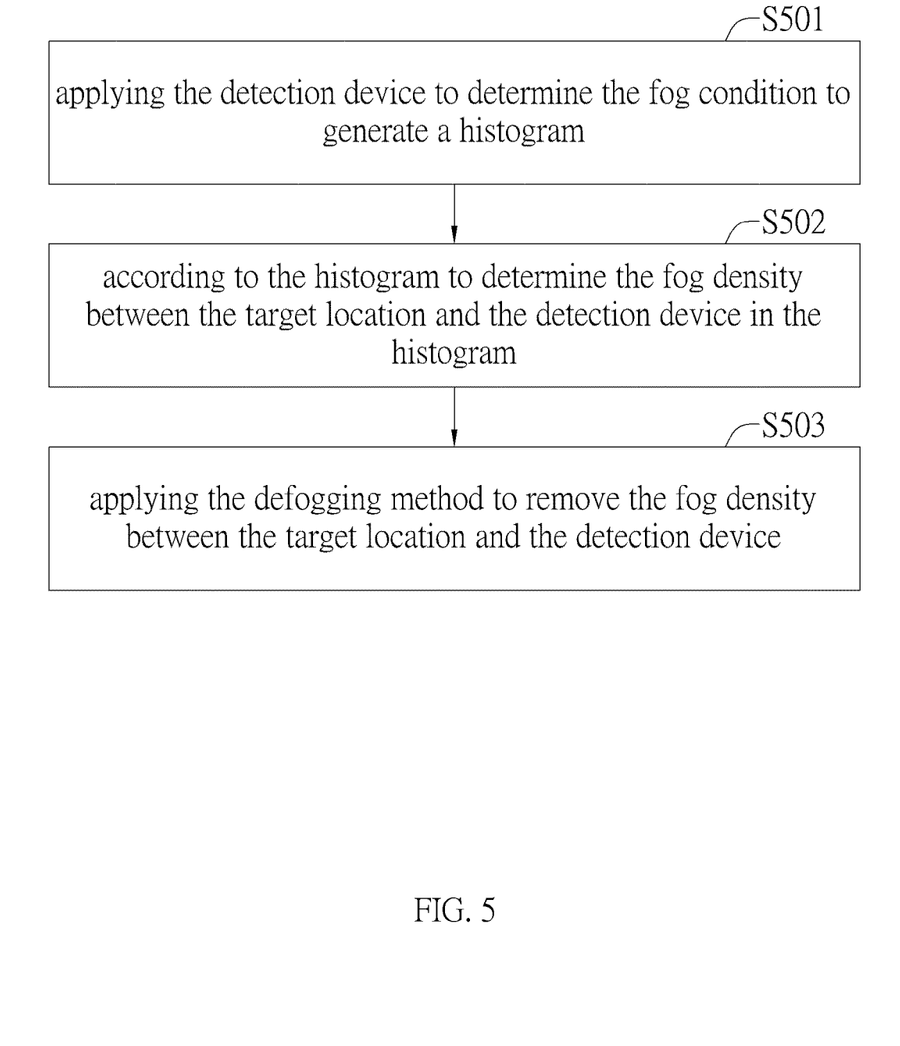
FIG. 5 shows a flow chart of a method of LiDAR defogging according to an embodiment of the invention.

FIG. 5 is a flowchart showing a defogging method according to an embodiment of the present invention. The method includes: applying the detection device 101 to determine the fog condition and generate a histogram (S501), and, based on the histogram, determine the fog density (S502) between the target location 102 and the detection device 101 from the histogram; and further applying the defogging method to remove the fog density (S503) between the target location 102 and the detection device 101.

The step of applying the detection device 101 to determine the fog condition and generate a histogram further includes: collecting information of the blank channel without the target to determine the fog condition; and using the photon reflectance emitted by the detection device to generate the histogram. In the aforementioned histogram, one can apply time-related single photon technology to record the time information of each photon reception event, and accumulate the time information of multiple photon reception events caused by multiple laser pulse light waves within an integration time unit to form a histogram. The histogram is processed to further estimate the distance and reflectivity of the target location, and to determine the fog density between the target location and the detection device. If the fog density is too low and the distance between the target location and the detection device is short, the target detection distance estimation method is applied to remove the influence of the fog. The aforementioned defogging method is the best scenario comparison method. The best scenario comparison method compares the histogram with another best scenario histogram to remove the fog. Another way to generate the best scenario histogram is to apply the existing LiDAR technology, models, and equations in conjunction with key parameter values to generate the best scenario histogram. The aforementioned method of defogging is the deep learning method.

LiDAR is one of the sensors that the Advanced Driver Assistance System (ADAS) of intelligent transportation relies on for environmental perception and has the advantages of high-resolution scanning and high accuracy in ranging. It is hard to be completely replaced by cameras or radar. However, LiDAR is more susceptible to bad weather, and the impact of smog on LiDAR is more serious. Therefore, how to combat smog is an important part of LiDAR's functions. This present invention proposes a set of countermeasures against the fog effect to improve the reliability of LiDAR in harsh weather.

The present invention provides LiDAR with different strategies to deal with different fog situations. These strategies are based on our comprehensive understanding of the fog effect and the characteristics of LiDAR and are highly feasible. In this present invention, according to the estimated fog conditions, different operation modes were provided for mid/long range and close range. This present invention uses the first-hand information of the photon reception event histogram to perform high-level operations such as estimating the condition of the fog and eliminating the fog signal. Combined with the optimization of the LiDAR operation mode, it can effectively respond to the impact of fog.

The present invention proposes countermeasures for LiDAR under foggy conditions. First, LiDAR determines the concentration of fog based on the histogram of photon detection events or the distance distribution of point clouds, and sets one or more LiDAR operation modes and data processing methods accordingly. Generally speaking, the density of fog can be divided into three conditions and the range of light scanning distance can be divided into two ranges. In the medium/long range, the operation mode of LiDAR should strengthen the energy of the target echo signal. In the close range, defogging should be performed first, then target detection and target distance estimation. Later, the present invention further proposes a defogging calculation model to make the defogging method of the present invention more practical.

Impact of Fog.

In a foggy environment, the target signal will suffer strong attenuation, and in the histogram under dense fog, collision due to fog will appear in a close range. Therefore, LiDAR for advanced driver assistance systems (ADAS) needs to solve two problems: first, LiDAR may miss detected objects; second, fog may cause false alarms. It is recommended that LiDAR data processing include the following functions to manage fog effects. First, it is necessary to make adaptive decisions about the presence of fog. Secondly, LiDAR should be able to handle the attenuation of the signal, especially for the detection of objects at long ranges. Finally, the bumps caused by short-range fogging should be eliminated to eliminate the erroneous points in the point cloud. In the following subsections, the algorithms for these three tasks will be introduced.

Distribution of Point Cloud or Photon Number.

When the fog is even, bumps may be caused by the fog at a close range. The fog condition can be estimated intuitively through the statistics of close-range photon counts. In particular, if the photon counts of all pixels are considered, the reliability of estimation can be greatly improved. A similar method can be found in the defogging of an image. The author found that in an image block without sky, if there is no fog, the intensity of some pixels of at least one color channel is close to zero. In other words, the presence of "dark channels" can be used to determine whether the image is blurred.

Here, we choose to prove the correlation between fog conditions and point cloud distribution rather than the photon count in the histogram. This is because according to our understanding of the effects of fog, virtual fog point clouds can be synthesized from point cloud databases in the public domain (such as KITTI Vision Benchmark Suite) and the field data of fog point clouds or histograms are not easily available). For vehicle applications, under normal circumstances, the number of cloud points in a very short range will be very small. However, when the LiDAR is operating in a foggy environment, the number of cloud points in a short range (such as 3 m) will increase dramatically. The percentage of points in a certain range can be used to determine the atomization conditions.

Due to server signal attenuation, it is a big challenge for LiDAR to reliability detect a long-range object in a fog. Tradition peak and center mass detection may not be enough to process reliable detection and accurate range estimated. Therefore, the likelihood ratio test (LRT) has been developed to solve this problem. Here, it expends the threshold setting mechanism to implement constant false alarm rate (CFAR) detection. Let the null hypothesis $H_0$ indicates the existence of an object and the alternative hypothesis $H_1$ is indicates otherwise. Since photon count in the SPAD detector mostly follows a Poisson distribution, the probabilistic model of the receiving photon count in an N length window is:

$$P_{\lambda_y}(Y_0, \ldots, Y_{N-1}) = \prod_{R=0}^{N-1} \left\{ e^{-\lambda_y} \cdot \frac{\lambda_y^{Y_R}}{Y_R!} \right\} \tag{2}$$

$$H_0: \lambda_y(R) = \lambda_s(R) + \lambda_w(R) \tag{3}$$

$$H_1: \lambda_y(R) = \lambda_w(R) \tag{4}$$

The window length generally corresponds to the laser pulse width. The parameters $\lambda s$ and $\lambda w$ represent the average photon count caused by the echo signal and background noise, respectively. Then the likelihood ratio function in the window is.

$$L(Y_0, \ldots, Y_{N-1}) = \frac{P_{\lambda_y|H_0}(Y_0, \ldots, Y_{N-1})}{P_{\lambda_y|H_1}(Y_0, \ldots, Y_{N-1})} = \prod_{R=0}^{N-1} \left\{ e^{-\alpha \cdot I(R)} \cdot \left[ \frac{\alpha \cdot I(R) + \lambda_w(R)}{\lambda_w(R)} \right]^{Y_R} \right\} \tag{5}$$

The window will slide over the histogram, and if the LRT exceeds a certain threshold, it shows that there is an object in the window. Two parameters $\alpha$ and $\lambda w$ must be estimated before performing LRT. The background noise mainly comes from sunlight, and $\lambda w$ can be estimated by averaging the photon count when the transmitter is turned off. Regarding the attenuation factor $\hat{\alpha}$, one can obtain a value by assuming $\alpha \cdot I(n) + \lambda w \approx \alpha[I(n) + \lambda w]$ and maximizing $nP_{\lambda_y|H_0}(Y_0, \ldots, Y_{N-1})$, using the generalized maximum likelihood method.

$$\hat{\alpha} = \frac{\sum_{n=0}^{N-1} \frac{k_n I(n)}{I(n) + \lambda_w}}{\sum_{n=0}^{N-1} I(n)} \tag{6}$$

For better reliability, the LRT threshold should be set using the constant false alarm rate (CFAR) principle. A simple method for approximate implementation of CFAR is proposed here. Note that the background noise follows the Poisson distribution and its expected value is equal to the variance. Therefore, the threshold that exceeds the standard deviation multiple of the average count directly corresponds to the false alarm rate level.

The threshold=$\hat{\lambda}_w + n\sqrt{\hat{\lambda}_w}$, n is scalar (7)

In the present invention, through the theoretical LiDAR system model and experiments conducted in the fog tube, the effect of fog on the LiDAR in the automotive application environment is studied. Based on the knowledge obtained from theory and simulation, a method to mitigate the effects of fog is proposed. First, a statistical-based method is used to indicate fog conditions. Secondly, LRT enhances the sensitivity of the detector so that the LiDAR can operate at long range under severe signal attenuation due to fog. A CFAR-based method has also been developed to set the threshold for object detection. Third, a defogging algorithm by subtracting the estimated fog profile is proposed to eliminate the effects of fog, especially in short range, such as within 20 m. Fog contour estimation uses the EM algorithm to iteratively find the parameters of the fog model. The results of simulation and experiment show the effectiveness and limitations of the proposed method.

Further, in another embodiment, the LiDAR defogging system includes: a detection device, emitting a detection signal; and a target location, receiving the detection signal; wherein the detection device emits the detection signal passing through a fog to reach the target location to determine the fog condition, so as to generate a histogram, and use the histogram to determine fog concentration signal between the target location and the detection device in the histogram, and apply one of the best scenario comparison method and deep learning method to decrease the fog concentration signal between the target location and the detection device; wherein the best scenario comparison method further comprises: the detection device is used to collect blank channel information where no target location exists, and determines the fog condition signal according to the reflectivity of the emitted detection signal, and further generates a best histogram; the histogram is compared with the best histogram to decrease fog concentration signal between the target location and the detection device.

Additionally, the detection signal is a laser pulsed light wave, and hence the detection device uses a time-related single photon technology to record the time information of each photon reception event of the emitted laser pulsed light wave; within an integration time unit, the time information of multiple photon reception events caused by multiple laser pulse light waves is accumulated to form the histogram and the best histogram. The deep learning method uses the artificial intelligence or neural networks to decrease the fog concentration signal between the target location and the detection device in the histogram.

The present invention has been described by the above-mentioned related embodiments, and however, the above-mentioned embodiments are only examples for implementing the present invention. It must be pointed out that the disclosed embodiments do not limit the scope of the present invention. Conversely, the spirit and scope of modifications and equal settings included in the scope of the patent application are included in the scope of the invention.

What is claimed is:

1. A LiDAR defogging system, comprising:
   a transmitter configured to emit a detection signal toward a field of view of the LiDAR defogging system;
   a detector configured to receive an echo signal reflected from an object in the field of view of the LiDAR defogging system; and
   an instrument configured to:
      generate a first histogram based on the detection signal and the echo signal, wherein the x-axis of the first histogram represents as at least one time slot between the time for emitting the detection signal and the time for receiving the echo signal, and the y-axis of the first histogram represents as energy information of the echo signal;
      determine a concentration of fog between the detector and the object by comparing the first histogram and a second histogram generated by collecting blank channel information, wherein the blank channel information is derived by signal reflected from the fog; and
      remove an interference of the fog from the echo signal according to the concentration of the fog.

2. The LiDAR defogging system according to claim 1, wherein the transmitter is further configured to emit the detection signal in a form of laser pulsed light wave.

3. The LiDAR defogging system according to claim 1, wherein the instrument is further configured to:
   estimate a distance between the object and the LiDAR defogging system.

4. A defogging method for a LiDAR defogging system, comprising:
   emitting a detection signal toward a field of view of the LiDAR defogging system;
   receiving an echo signal reflected from an object in the field of view of the LiDAR defogging system;
   generating a first histogram based on the detection signal and the echo signal, wherein the x-axis of the first histogram represents as at least one time slot between the time for emitting the detection signal and the time for receiving the echo signal, and the y-axis of the first histogram represents as energy information of the echo signal;
   determining a concentration of fog between the LiDAR defogging system and the object by comparing the first histogram and a second histogram generated by collecting blank channel information of the detector, wherein the blank channel information is derived by signal reflected from the fog; and
   removing an interference of the fog from the echo signal according to the concentration of the fog.

5. The defogging method according to claim 4, wherein the detection signal is emitted in a form of laser pulsed light wave.

6. The LiDAR defogging method according to claim 4, further comprising:
   estimating a distance between the object and the LiDAR defogging system.

* * * * *